United States Patent
Huang et al.

(10) Patent No.: US 9,995,955 B2
(45) Date of Patent: Jun. 12, 2018

(54) PRESSURE TOUCH LIQUID CRYSTAL DISPLAY PANEL AND MANUFACTURE METHOD THEREOF

(71) Applicant: WUHAN CHINA STAR OPTOELECTRONICS TECHNOLOGY CO., LTD., Hubei (CN)

(72) Inventors: Yaoli Huang, Hubei (CN); Xinglong He, Hubei (CN)

(73) Assignee: WUHAN CHINA STAR OPTOELECTRONICS TECHNOLOGY CO., LTD., Hubei (CN)

(*) Notice: Subject to any disclaimer, the term of this patent is extended or adjusted under 35 U.S.C. 154(b) by 173 days.

(21) Appl. No.: 15/116,803

(22) PCT Filed: Apr. 7, 2016

(86) PCT No.: PCT/CN2016/078689
§ 371 (c)(1),
(2) Date: Aug. 4, 2016

(87) PCT Pub. No.: WO2017/161604
PCT Pub. Date: Sep. 28, 2017

(65) Prior Publication Data
US 2018/0113343 A1    Apr. 26, 2018

(30) Foreign Application Priority Data
Mar. 25, 2016 (CN) .......................... 2016 1 0176005

(51) Int. Cl.
*G02F 1/1333* (2006.01)
*G02F 1/1335* (2006.01)
(Continued)

(52) U.S. Cl.
CPC .... *G02F 1/13338* (2013.01); *G02F 1/133308* (2013.01); *G02F 1/133528* (2013.01);
(Continued)

(58) Field of Classification Search
CPC ........... G02F 1/13338; G02F 1/133308; G02F 1/133528; G02F 2001/133317;
(Continued)

(56) References Cited

U.S. PATENT DOCUMENTS

2016/0098120 A1* 4/2016 Miyake .................. G06F 3/044
 345/174
2017/0177121 A1* 6/2017 Ishii ........................ G06F 3/044
(Continued)

*Primary Examiner* — Nathanael R Briggs
(74) *Attorney, Agent, or Firm* — WPAT, PC

(57) ABSTRACT

A pressure touch liquid crystal display panel, which includes a liquid crystal panel, an top polarizer, a touchscreen, a force sensing layer, a bottom polarizer, a backlight, and an iron frame. The top polarizer is disposed on an upper surface of the liquid crystal panel. The touchscreen is disposed on an upper surface of the top polarizer. A force sensing layer is disposed on a lower surface of the liquid crystal panel. A bottom polarizer is disposed on a lower surface of the force sensing layer. A backlight is disposed on a lower surface of the bottom polarizer. The iron frame is disposed outside of the backlight.

17 Claims, 2 Drawing Sheets

(51) Int. Cl.
*G06F 3/041* (2006.01)
*G06F 3/044* (2006.01)

(52) U.S. Cl.
CPC ............ *G06F 3/044* (2013.01); *G06F 3/0412* (2013.01); *G06F 3/0414* (2013.01); *G02F 2001/133317* (2013.01); *G06F 2203/04103* (2013.01)

(58) Field of Classification Search
CPC ...... G06F 3/0412; G06F 3/0414; G06F 3/044; G06F 2203/04103
See application file for complete search history.

(56) References Cited

U.S. PATENT DOCUMENTS

| 2017/0235414 A1* | 8/2017 | Ding | G06F 3/0416 |
| | | | 345/174 |
| 2017/0242506 A1* | 8/2017 | Patel | G06F 3/044 |
| 2018/0074634 A1* | 3/2018 | Kurasawa | G06F 3/0412 |

* cited by examiner

PRESSURE TOUCH LIQUID CRYSTAL DISPLAY PANEL AND MANUFACTURE METHOD THEREOF

FIELD OF THE INVENTION

The present invention relates to a touch technology field, and in particular to a pressure touch liquid crystal display panel and a manufacture method thereof.

BACKGROUND OF THE INVENTION

FIG. 1 is a structural diagram of the conventional capacitive pressure touch liquid crystal display panel. The pressure touch liquid crystal display panel 10 includes a touchscreen 11, a liquid crystal panel 12, a backlight 13, and a pressure touch panel 14. The pressure touch panel 14 is disposed below the backlight 13, including a force sensing conductive layer 141 and a fixed metal layer 142 (i.e. a metal box of the pressure touch liquid crystal display panel 10). A capacitor is formed between the force sensing conductive layer 141 and the fixed metal layer 142.

When the touchscreen 11 is touched by a finger, a corresponding deformation of the force sensing conductive layer 141 happens because of a pressure between the finger and the touchscreen 11. The capacitance of the capacitor is thus changed, and then a value of the pressure is calculated by collecting a change value of the capacitance between the force sensing conductive layer 141 and the fixed metal layer 142 before and after the touching.

Since the pressure touch panel 14 of the conventional capacitive pressure touch liquid crystal display panel is usually mounted outside the liquid crystal panel 12, the whole thickness of the pressure touch liquid crystal display panel is increased, which is disadvantageous to a slim design of the capacitive pressure touch liquid crystal display panel. Besides, the force sensing conductive layer 141 of the pressure touch panel needs to better fit outside the backlight 13, thus a production cost of the capacitive pressure touch liquid crystal display panel is higher.

Therefore, it is necessary to provide a pressure touch liquid crystal display panel and a manufacture method thereof so as to solve the problem existing in the existing technology.

SUMMARY OF THE INVENTION

In this way, the present invention provides a pressure touch liquid crystal display panel and a manufacture method thereof which has a thin design and a lower production cost, in order to solve the technical problems of a thicker and a higher cost in the existing pressure touch liquid crystal display panel and the manufacturing method thereof.

An embodiment of the present invention provides a pressure touch liquid crystal display panel. The pressure touch liquid crystal display panel includes: a liquid crystal panel; an top polarizer, disposed on an upper surface of the liquid crystal panel, and used for filtering a polarized light setting a polarized state; a touch screen, disposed on an upper surface of the top polarizer, and used for receiving a touch signal; a force sensing layer, disposed on a lower surface of the liquid crystal panel, and used as a first substrate of a force sensing capacitor; a bottom polarizer, disposed on a lower surface of the force sensing layer, and used for filtering a polarized light setting a polarized state; a backlight, disposed on a lower surface of the bottom polarizer, and used for providing a display light source; and an iron frame, disposed outside the backlight, and used as a second substrate of the force sensing capacitor. A gap is set between the iron frame and the backlight. The force sensing layer is a transparent conductive layer; the gap between the iron frame and the force sensing layer is in a range from 0.1 mm to 2 mm.

In the pressure touch liquid crystal display panel of the present invention, a thickness of the force sensing layer is in a range of 30 nm to 100 nm.

In the pressure touch liquid crystal display panel of the present invention, the force sensing layer is formed on the lower surface of the liquid crystal panel by a sputtering method.

In the pressure touch liquid crystal display panel of the present invention, the force sensing layer and the iron frame form the force sensing capacitor.

An embodiment of the present invention further provides a pressure touch liquid crystal display panel. The pressure touch liquid crystal display panel includes: a liquid crystal panel; an top polarizer, disposed on an upper surface of the liquid crystal panel, and used for filtering a polarized light setting a polarized state; a touch screen, disposed on an upper surface of the top polarizer, and used for receiving a touch signal; a force sensing layer, disposed on a lower surface of the liquid crystal panel, used as a first substrate of a force sensing capacitor; a bottom polarizer, disposed on a lower surface of the force sensing layer, and used for filtering a polarized light setting a polarized state; a backlight, disposed on a lower surface of the bottom polarizer, and used for providing a display light source; and an iron frame, disposed outside the backlight, and used as a second substrate of the force sensing capacitor. A gap is set between the iron frame and the backlight.

In the pressure touch liquid crystal display panel of the present invention, the force sensing layer is a transparent conductive layer.

In the pressure touch liquid crystal display panel of the present invention, the force sensing layer is formed on the lower surface of the liquid crystal panel by a sputtering method.

In the pressure touch liquid crystal display panel of the present invention, the gap between the iron frame and the force sensing layer is in a range from 0.1 mm to 2 mm.

In the pressure touch liquid crystal display panel of the present invention, a thickness of the force sensing layer is in a range of 30 nm to 100 nm.

In the pressure touch liquid crystal display panel of the present invention, the force sensing layer and the iron frame form the force sensing capacitor.

An embodiment of the present invention further provides a method for manufacturing a pressure touch liquid crystal display panel. The method includes: providing a liquid crystal panel; forming a transparent conductive layer on a lower surface of the liquid crystal panel; patterning the transparent conductive layer to form a force sensing layer; disposing an top polarizer and a touchscreen sequentially on an upper surface of the liquid crystal panel; and disposing a bottom polarizer, a backlight, and an iron frame on a lower surface of the liquid crystal panel sequentially. There is a gap set between the iron frame and the backlight.

In the method for manufacturing the pressure touch liquid crystal display panel, after disposing a bottom polarizer, a backlight, and an iron frame on a lower surface of the liquid crystal panel sequentially, the method further includes: disposing a display drive circuit of the liquid crystal panel and a pressure sensing drive circuit of the force sensing layer.

In the method for manufacturing the pressure touch liquid crystal display panel, the force sensing layer and the iron frame form the force sensing capacitor.

In the method for manufacturing the pressure touch liquid crystal display panel, the force sensing layer is a transparent conductive layer.

In the method for manufacturing the pressure touch liquid crystal display panel, the force sensing layer is formed on the lower surface of the liquid crystal panel by a sputtering method.

In the method for manufacturing the pressure touch liquid crystal display panel, a thickness of the force sensing layer is in a range of 30 nm to 100 nm.

In the method for manufacturing the pressure touch liquid crystal display panel, the gap between the iron frame and the force sensing layer is in a range from 0.1 mm to 2 mm.

The pressure touch liquid crystal display panel and the manufacture method of the present invention can further reduce the thickness of the pressure touch liquid crystal display panel by disposing the force sensing layer on the lower surface of the liquid crystal panel, and the whole production cost of the pressure touch liquid crystal display panel is lower, therefore the technical problems of a larger thickness and a higher production cost in the existing pressure touch liquid crystal display panel and the manufacturing method thereof are solved.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF THE PREFERRED EMBODIMENTS

Figure 1:
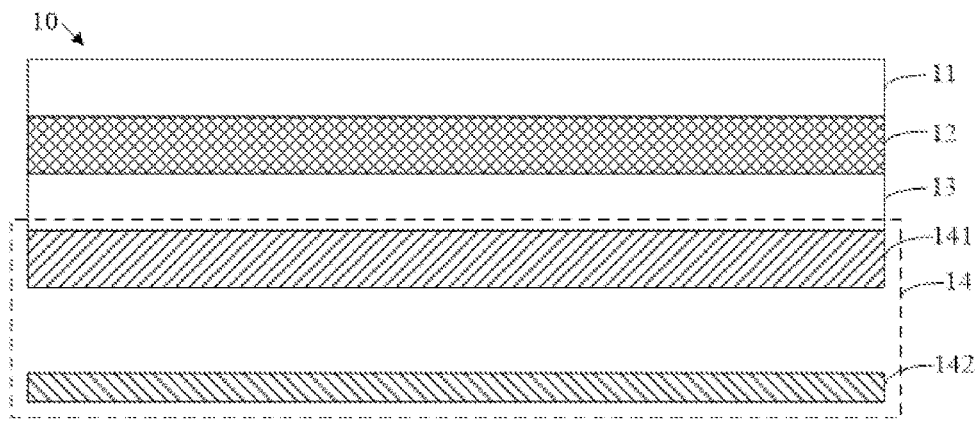
FIG. 1 illustrates a structural diagram of the existing capacitive pressure touch liquid crystal display panel.

As used in this specification the term "embodiment" means that instance, an example, or illustration. In addition, for the articles in this specification and the appended claims, "a" or "an" in general can be interpreted as "one or more" unless specified otherwise or clear from context to determine the singular form.

In the drawings, the same reference numerals denote units with similar structures.

Figure 2:
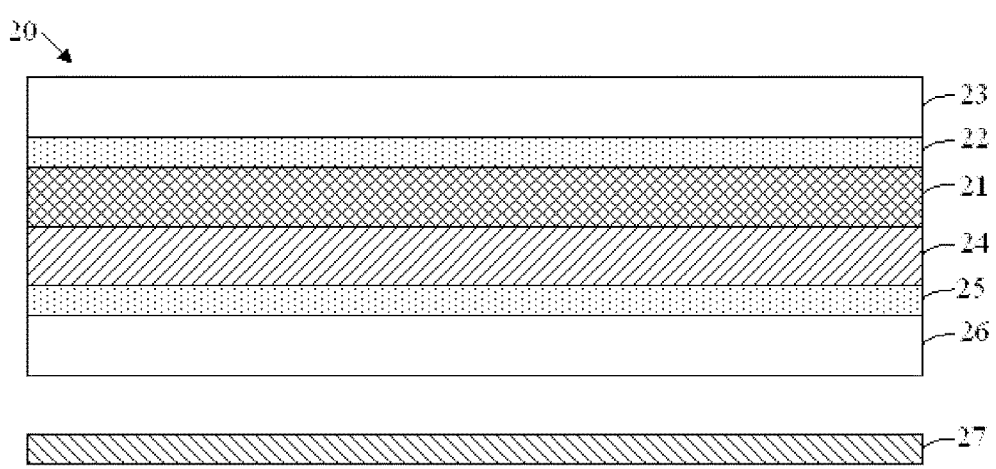
FIG. 2 illustrates a structural diagram of a preferred embodiment of the pressure touch liquid crystal display panel of the present invention.

Please refer to FIG. 2, which illustrates a structural diagram of the pressure touch liquid crystal display panel according to a preferred embodiment of the present invention. The pressure touch liquid crystal display panel 20 comprises a liquid crystal panel 21, an top polarizer 22, a touchscreen 23, a force sensing layer 24, a bottom polarizer 25, a backlight 26, and an iron frame 27.

The top polarizer 22, disposed on an upper surface of the liquid crystal panel 21, is used for filtering the polarized light in comply with a setting polarized state. The touchscreen 23, disposed on an upper surface of the top polarizer 22, is used for receiving the touch signal. The force sensing layer 24, disposed on a lower surface of the liquid crystal panel 21, is used as a first substrate of the force sensing capacitor. The bottom polarizer 25, disposed on a lower surface of the force sensing layer 24, is used for filtering the polarized light in comply with a setting polarized state. The backlight 26, disposed on a lower surface of the bottom polarizer 25, is used as a display light source. The iron frame 27, spaced apart from the backlight 26 and disposed outside the backlight 26, is used as a second substrate of the force sensing capacitor.

In the pressure touch liquid crystal display panel 20 of the present invention, the force sensing layer 24 is a transparent conductive layer, such as ITO (Indium Tin Oxide) layer. The force sensing layer 24 with a thickness in a range between 30 nm and 100 nm is sputtered on the lower surface of the liquid crystal panel 21. The force sensing layer 24 is designed as a transparent conductive layer, not influencing the normal display operation of the liquid crystal panel 21. The thickness of the force sensing layer 24 is smaller, with less influence on the thickness of the pressure touch liquid crystal display panel 20.

When the pressure touch liquid crystal display panel 20 of the preferred embodiment is used, the force sensing layer 24 and the iron frame 27 form a force sensing capacitor. In response to a press applied on the touchscreen 23, a deformation of the force sensing layer 24 causes a change in a distance between the force sensing layer 24 and the iron frame 27 as well as a change of the capacitance of the force sensing capacitor. A magnitude of the pressure is calculated by collecting a change of the capacitance between the force sensing layer 24 and the iron frame 27 before and after the press.

Meanwhile, the force sensing layer 24 of the pressure touch liquid crystal display panel 20 of the preferred embodiment is disposed in the panel structure. The whole thickness of the pressure touch liquid crystal display panel 20 is smaller, and the force sensing layer 24 and the liquid crystal panel 21 are not necessarily fitted, thus a slim design can be performed on the pressure touch liquid crystal display panel 20, and the production cost is lower.

In the preferred embodiment, the thickness of the pressure touch liquid crystal display panel can be further reduced by disposing a force sensing layer on the lower surface of the liquid crystal panel of the pressure touch liquid crystal display panel, and the whole production cost of the pressure touch liquid crystal display panel is lower.

Figure 3:
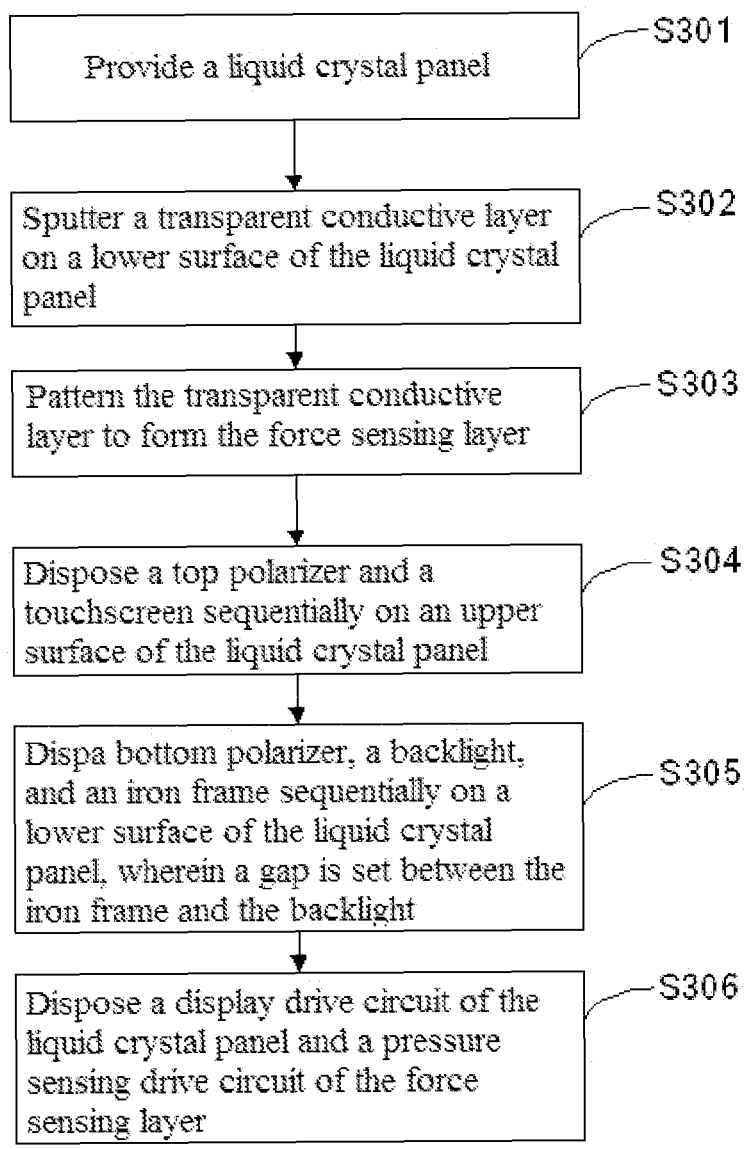
FIG. 3 illustrates a flowchart of a preferred embodiment of the method for manufacturing the pressure touch liquid crystal display panel of the present invention.

The present invention further provides a method for manufacturing the pressure touch liquid crystal display panel. Please refer to FIG. 3, which illustrates a flowchart of a method for manufacturing the pressure touch liquid crystal display panel according to a preferred embodiment of the present invention. The method for manufacturing the pressure touch liquid crystal display panel includes:

Step S301: providing a liquid crystal panel;

Step S302: forming a transparent conductive layer on a lower surface of the liquid crystal panel;

Step S303: patterning the transparent conductive layer to form a force sensing layer;

Step S304: disposing an top polarizer and a touchscreen on an upper surface of the liquid crystal panel sequentially;

Step S305: disposing a bottom polarizer, a backlight and an iron frame on a lower surface of the liquid crystal panel sequentially. There is a space set between the iron frame and the backlight;

Step S306: disposing a display drive circuit of the liquid crystal panel and a pressure sensing drive circuit of the force sensing layer.

The specific steps of the method for manufacturing the pressure touch liquid crystal display panel of the preferred embodiment is described in the following.

In Step S301, a liquid crystal panel is provided. The liquid crystal panel could be a liquid crystal panel having been thinned. The thickness of the liquid crystal panel is about 0.4 mm optionally, the liquid crystal panel could also have not been thinned. Then go to Step S302.

In Step S302, a transparent conductive layer, such as ITO (Indium Tin Oxide) layer, is sputtered on an outer surface of an array substrate of the liquid crystal panel. The thickness of the transparent conductive layer is preferably in a range of 30 nm to 100 nm. Then go to Step S303.

In Step S303, the transparent conductive layer sputtered in Step S302 is patterned to form the force sensing layer with the same shape as a touch electrode. Then go to Step S304.

In Step S304, a top polarizer and a touchscreen are sequentially disposed on an upper surface of the liquid crystal panel with the force sensing layer manufactured. Then go to Step S305.

In Step S305, a bottom polarizer, a backlight, and an iron frame are sequentially disposed on a lower surface of the liquid crystal panel with the force sensing layer manufactured. Because a gap is set between the iron frame and the backlight, the force sensing layer and the iron frame can form the force sensing capacitor. Then go to Step S306.

In Step S306, disposing a display drive circuit of the liquid crystal panel and a pressure sensing drive circuit of the force sensing layer. Such as using a flexible printed circuit (FPC), connecting a force sensing electrode of the force sensing layer to an external force sensing chip, using the flexible printed circuit to connect a pixel electrode of the liquid crystal panel to the external display drive chip.

Then a manufacture process of the pressure touch liquid crystal display panel of the preferred embodiment is completed. Please refer to relative description in the preferred embodiment of the pressure touch liquid crystal display panel mentioned above for a specific usage method of the pressure touch liquid crystal display panel.

The pressure touch liquid crystal display panel and the manufacture method of the present invention can further reduce the thickness of the pressure touch liquid crystal display panel by disposing the force sensing layer on the lower surface of the liquid crystal panel, and the whole production cost of the pressure touch liquid crystal display panel is lower. The technical problems of larger thickness and higher production cost of the existing pressure touch liquid crystal display panel and the manufacture thereof are solved.

In summary, although the present invention has been described in preferred embodiments above, the preferred embodiments described above are not intended to limit the invention. Persons skilled in the art, without departing from the spirit and scope of the invention otherwise, may be used for a variety modifications and variations, so the scope of the invention as defined by the claims prevails.

What is claimed is:

1. A pressure touch liquid crystal display panel, comprising:
    a liquid crystal panel;
    a top polarizer, disposed on an upper surface of the liquid crystal panel, used for filtering a polarized light setting a polarized state;
    a touchscreen, disposed on an upper surface of the top polarizer, and used for receiving a touch signal;
    a force sensing layer, disposed on a lower surface of the liquid crystal panel, and used as a first substrate of a force sensing capacitor;
    a bottom polarizer, disposed on a lower surface of the force sensing layer, and used for filtering a polarized light setting a polarized state;
    a backlight, disposed on a lower surface of the bottom polarizer, and used for providing a display light source; and
    an iron frame, disposed outside the backlight, and used as a second substrate of the force sensing capacitor, wherein a gap is set between the iron frame and the backlight;
    wherein the force sensing layer is a transparent conductive layer; the gap between the iron frame and the force sensing layer is in a range from 0.1 mm to 2 mm.

2. The pressure touch liquid crystal display panel of claim 1, wherein a thickness of the force sensing layer is in a range of 30 nm to 100 nm.

3. The pressure touch liquid crystal display panel of claim 1, wherein the force sensing layer is formed on the lower surface of the liquid crystal panel by a sputtering method.

4. The pressure touch liquid crystal display panel of claim 1, wherein the force sensing layer and the iron frame form the force sensing capacitor.

5. A pressure touch liquid crystal display panel, comprising:
    A liquid crystal panel;
    a top polarizer, disposed on an upper surface of the liquid crystal panel, and used for filtering a polarized light setting a polarized state;
    a touch screen, disposed on an upper surface of the top polarizer, and used for receiving a touch signal;
    a force sensing layer, disposed on a lower surface of the liquid crystal panel, and used as a first substrate of a force sensing capacitor;
    a bottom polarizer, disposed on a lower surface of the force sensing layer, and used for filtering a polarized light setting a polarized state;
    a backlight, disposed on a lower surface of the bottom polarizer, and used for providing a display light source; and
    an iron frame, disposed outside the backlight, and used as a second substrate of the force sensing capacitor, wherein a gap is set between the iron frame and the backlight.

6. The pressure touch liquid crystal display panel of claim 5, wherein the force sensing layer is a transparent conductive layer.

7. The pressure touch liquid crystal display panel of claim 5, wherein the gap between the iron frame and the force sensing layer is in a range from 0.1 mm to 2 mm.

8. The pressure touch liquid crystal display panel of claim 5, wherein a thickness of the force sensing layer is in a range of 30 nm to 100 nm.

9. The pressure touch liquid crystal display panel of claim 6, wherein the force sensing layer is formed on the lower surface of the liquid crystal panel by a sputtering method.

10. The pressure touch liquid crystal display panel of claim 5, wherein the force sensing layer and the iron frame form the force sensing capacitor.

11. A method for manufacturing a pressure touch liquid crystal display panel, comprising:
    providing a liquid crystal panel;
    forming a transparent conductive layer on a lower surface of the liquid crystal panel;
    patterning the transparent conductive layer to form a force sensing layer;
    disposing an top polarizer and a touchscreen sequentially on an upper surface of the liquid crystal panel; and disposing a bottom polarizer, a backlight, and an iron frame on a lower surface of the liquid crystal panel sequentially, wherein there is a gap set between the iron frame and the backlight.

12. The method for manufacturing the pressure touch liquid crystal display panel of claim 11, wherein after disposing a bottom polarizer, a backlight, and an iron frame on a lower surface of the liquid crystal panel sequentially, the method further comprises:

disposing a display drive circuit of the liquid crystal panel and a pressure sensing drive circuit of the force sensing layer.

13. The method for manufacturing the pressure touch liquid crystal display panel of claim 11, wherein the force sensing layer and the iron frame form a force sensing capacitor.

14. The method for manufacturing the pressure touch liquid crystal display panel of claim 11, wherein the force sensing layer is a transparent conductive layer.

15. The method for manufacturing the pressure touch liquid crystal display panel of claim 14, wherein the force sensing layer is formed on the lower surface of the liquid crystal panel by a sputtering method.

16. The method for manufacturing the pressure touch liquid crystal display panel of claim 11, wherein a thickness of the force sensing layer is in a range of 30 nm to 100 nm.

17. The method for manufacturing the pressure touch liquid crystal display panel of claim 11, wherein the gap between the iron frame and the force sensing layer is in a range from 0.1 mm to 2 mm.

* * * * *